United States Patent
Zhou et al.

(10) Patent No.: US 10,315,336 B2
(45) Date of Patent: Jun. 11, 2019

(54) DRILL BIT

(71) Applicant: Bosch Power Tools (China) Co. Ltd., Hangzhou, Zhejiang (CN)

(72) Inventors: Long Zhou, Zhejiang (CN); Tieyan Zhang, Zhejiang (CN); Bin Hong, Zhejiang (CN); Massimo Anghileri, Zhejiang (CN)

(73) Assignees: Bosch Power Tools (China) Co., LTD., Zhejiang (CN); Robert Bosch GmbH, Stuttgart (DE)

( * ) Notice: Subject to any disclaimer, the term of this patent is extended or adjusted under 35 U.S.C. 154(b) by 237 days.

(21) Appl. No.: 15/370,748

(22) Filed: Dec. 6, 2016

(65) Prior Publication Data

US 2017/0157799 A1 Jun. 8, 2017

(30) Foreign Application Priority Data

Dec. 8, 2015 (CN) .......................... 2015 1 0897514

(51) Int. Cl.
| | |
|---|---|
| *B23B 51/02* | (2006.01) |
| *E21B 10/58* | (2006.01) |
| *B25D 17/02* | (2006.01) |
| *B28D 1/14* | (2006.01) |

(52) U.S. Cl.
CPC .............. *B28D 1/146* (2013.01); *B23B 51/02* (2013.01); *B25D 17/02* (2013.01); *E21B 10/58* (2013.01); *B23B 2226/75* (2013.01); *B23B 2251/02* (2013.01)

(58) Field of Classification Search
CPC ........ E21B 10/32; E21B 10/445; E21B 10/58; B23B 2226/75; B23B 2251/02; B23B 51/02; B25D 17/02; B28D 1/146
See application file for complete search history.

(56) References Cited

U.S. PATENT DOCUMENTS

| | | | | |
|---|---|---|---|---|
| 2,040,074 | A * | 5/1936 | Brenholm | E21B 10/38 175/400 |
| 5,630,478 | A * | 5/1997 | Schimke | E21B 10/445 175/420.1 |
| 5,836,408 | A * | 11/1998 | Kleine | E21B 10/445 175/293 |
| 6,446,741 | B1 * | 9/2002 | Kersten | B23B 51/00 175/415 |

(Continued)

FOREIGN PATENT DOCUMENTS

| | | | | |
|---|---|---|---|---|
| EP | 1527836 | A2 * | 5/2005 | ............. B23B 51/02 |
| KR | 20140131979 | A * | 11/2014 | ............. B28D 1/146 |

*Primary Examiner* — Daniel P Stephenson
(74) *Attorney, Agent, or Firm* — Maginot, Moore & Beck LLP (57) ABSTRACT

A drill bit includes a tool body having a main body in the form of a cylinder. A chip removing structure is provided on the main body. The tool body has a distal end provided with a clamping slot and a cutter inlaid in the clamping slot. The cutter has at least two blade portions arranged circumferentially on the distal end of the tool body and extending radially relative to the tool body. Each of the blade portions has a front side along the drill bit's rotating direction and a back side against the rotating direction. The clamping slot covers the back side of one blade portion by an area larger than that used to cover the front side of the same blade portion.

9 Claims, 5 Drawing Sheets

(56) References Cited

U.S. PATENT DOCUMENTS

| | | | | |
|---|---|---|---|---|
| 6,702,047 B2* | 3/2004 | Huber | B23B 51/02 | |
| | | | 175/427 | |
| 6,817,428 B1* | 11/2004 | Miyanaga | B23B 51/02 | |
| | | | 175/323 | |
| 7,100,714 B1* | 9/2006 | Sollami | E21B 10/42 | |
| | | | 175/420.1 | |
| 7,540,341 B2* | 6/2009 | Miyanaga | B23B 51/02 | |
| | | | 175/323 | |
| 7,909,547 B2* | 3/2011 | Jordan | B23B 51/02 | |
| | | | 408/214 | |
| 8,109,700 B2* | 2/2012 | Jordan | B23B 51/02 | |
| | | | 408/214 | |
| 8,157,028 B2* | 4/2012 | Kersten | B23B 51/02 | |
| | | | 175/427 | |
| 8,960,336 B2* | 2/2015 | Kersten | B23B 51/02 | |
| | | | 175/398 | |
| 9,199,315 B2* | 12/2015 | Muhlfriedel | B23B 51/02 | |
| 2016/0175945 A1* | 6/2016 | Chang | B23C 3/02 | |
| | | | 407/34 | |
| 2017/0021434 A1* | 1/2017 | Kauper | B23C 5/16 | |
| 2017/0157799 A1* | 6/2017 | Zhou | B23B 51/02 | |
| 2018/0099337 A1* | 4/2018 | Woods | B23B 51/02 | |

* cited by examiner

DRILL BIT

This application claims priority under 35 U.S.C. § 119 to patent application number CN 201510897514.6 filed on Dec. 8, 2015 in China, the disclosure of which is incorporated herein by reference in its entirety.

FIELD

The present application is generally involved in the field of a drilling tool, for example a drill bit, especially for drilling a hard material such as stone.

BACKGROUND

Usually, an object to be processed can be drilled by a drilling tool. In case that the object to be processed is made of a relatively hard material such as stone, concrete, brick, a high strength composite material or the like, a hammer drill (for example, a stone drilling tool) can be usually used. The hammer drill has a hammer drill bit which generally includes a hard alloy cutter inlaid at a distal end of a tool body. The hard alloy cutter can punch various hard materials due to its high hardness.

In a conventional design of the hammer drill bit, in order to provide strong support for the hard alloy cutter, a large piece of material is usually left in the tool body behind the hard alloy cutter in respect to a direction of rotation of the drill bit. In this kind of design, no sufficient space is left for cutting chips. Therefore, those cutting chips cannot be removed/discharged out effectively. This leads to a had working condition for the drill bit. For example, high noise and much heat will generate to shorten the drill bit's service life and even reduce the drill bit's processing accuracy.

On the other hand, in some other designs, in order to increase the chip removing efficiency, the tool body material is partially removed behind the hard alloy cutter to form a space leading to a flute, such that the support of the tool body for the hard alloy cutter is weakened. This may result in that the distal end of the tool body is temporarily or permanently deformed and the cutter is deviated from its original position or even separated from the tool body.

Therefore, it is desirable to improve the drill bit of the prior art to overcome the short-comings.

SUMMARY OF THE INVENTION

It is an object of the present application to provide an improved drill bit which has strong support strength and whose chip removing efficiency is also enhanced.

Therefore, in one aspect of the present application, the present application proposes a drill bit comprising:
- a tool body having a main body in the form of a cylinder, on which main body a chip removing structure is provided, the tool body having a distal end provided with a clamping slot; and
- a cutter inlaid in the clamping slot;
- wherein the cutter has at least two blade portions which are arranged circumferentially on the distal end of the tool body and extend radially relative to the tool body, each of the blade portions has a front side along the drill bit's rotating direction and a back side against the rotating direction, and the clamping slot covers the back side of one blade portion by an area larger than that used to cover the front side of the same blade portion.

In a feasible embodiment, the drill bit has a notch in a part of the tool body behind the back side of the blade portion, which notch communicates with the chip removing structure, the front side of the blade portion constitutes a part of the notch, and observed in an axial view of the distal end of the tool body, the notch is located in a region of projection of the cylindrical tool body.

In another feasible embodiment, the front side of the blade portion meets with the back side of one adjacent blade portion such that an intersection point adjacent to the tool body's axis appears in the axial view of the distal end of the tool body, the front side of the blade portion meets with the clamping slot such that a front side supporting point appears in the axial view of the distal end of the tool body, the back side of the blade portion meets with the front side of the adjacent blade portion such that a back intersection point adjacent to the tool body's axis appears in the axial view of the distal end of the fool body, the back side of the blade portion meets with the clamping slot such that a back aide supporting point appears in the axial view of the distal end of the tool body, a distance, front the intersection point to the front side supporting point is defined as a front side reference length, a distance from the back intersect ion point to the back side supporting point is defined as a back side reference length, and the front side reference length is 1.2 to 2 times the back side reference length.

In another feasible embodiment, the distal end of the tool body is configured in a manner of rotational symmetry, the blade portions assembled at the distal end of the tool body are configured in a manner of rotational symmetry, the back intersection point of the blade portion is also the intersection point of one blade portion adjacent to the back side of the blade portion, and said blade portion adjacent to she back side of the blade portion has a front side reference length which is the same as that of the blade portion.

In another feasible embodiment, the front side of the blade portion meets with the back side of one adjacent blade portion such that an intersection point appears in the axial view of the distal end of the tool body, the front side of the blade portion meets with the clamping slot such that a front side supporting point appears in the axial view of the distal end of the tool body, the back side of the blade portion meets with the front side of the adjacent blade portion such that a back intersection point adjacent to the tool body's axis appears in the axial view of the distal end of the tool body, the back side of the blade portion meets with the clamping slot such that a back side supporting point appears in the axial view of the distal end of the tool body, a distance from the intersection point to the front side supporting point is defined as a front side reference length, a distance from the back intersection point to the back side supporting point is defined as a back side reference length, the drill bit has four blade portions which are equally-spaced front each other circumferentially on the tool body such that the back side of the blade portion is perpendicular to the front side of the adjacent blade portion; and observed in the axial view of the distal end of the tool body, the area of projection of the tool body's end face between two adjacent blade portions at the distal end of the tool body is larger than the area of a triangle, two right-angle sides of which triangle are along the front side reference length and the back side reference length respectively.

In another feasible embodiment the back side supporting point is located at the outer diameter of the tool body, and following the back side supporting point the tool body's outer contour has a supporting segment which coincides with the outer diameter of the tool body.

In another feasible embodiment, at the distal end of the tool body the back side supporting point extends by a supporting line which is substantially parallel to the axis of the tool body.

In another feasible embodiment, the outer contour projection of the tool body's end face between the two adjacent blade portions in the axial view of the distal end of the tool body is substantially line-transitional or arc-transitional in an outwardly-recessed or inwardly-recessed manner.

In another feasible embodiment, the projection of the distal end of the tool body in the axial view of the distal end of She tool body is substantially polygon-shaped, the blades portions of the drill bit are arranged adjacent to respective corners of the polygon and the number of the blade portions are the same as the corners, and the blade portions are offset towards the same side of the adjacent corners of the polygon in the rotating direction of the drill bit.

According the present application, because the clamping slot covers the back side of one blade portion by an area larger than that used to cover the front side of the same blade portion, a larger chip removing space is left for the notch in front of the front side of the blade portion and it is also ensured that the back side of the blade portion can be supported when subjecting to a work load.

BRIEF DESCRIPTION OF THE DRAWINGS

Now, the preceding and other aspects of the present application will be thoroughly known and understood by their concrete embodiments explained below in combination of the drawings. In the drawings.

DETAILED DESCRIPTION OF EMBODIMENTS

The present application is involved in how to improve a distal part of a drill bit, especially a drill bit whose distal end is provided with a hard alloy cutter, for example a hammer drill bit, a stone drill bit, a glass drill bit, a multipurpose drill bit or the like. In the context of the present application, the term "distal" refers to a direction of a part of the drill bit to be drilled into an object to be processed. The term "proximal" refers to a direction of a part of the drill bit that is to be clamped in a body of an electric drilling tool. It is known in the art that the drill bit generally comprises a distal tool body and a proximal shank. The tool body is used to drill a hole in the object to be processed. The shank is used to be clamped in the body of the electric drilling tool.

Now, some feasible embodiments of the present application will be explained below in respect to the drawings. In the different drawings, the same or similar components are represented by the same reference numerals. Also, it should be understood that the drawings are used for illustrative purposes only and that the size, proportional relation and number of the illustrated components cannot be construed to limit the present application.

Figure 1:
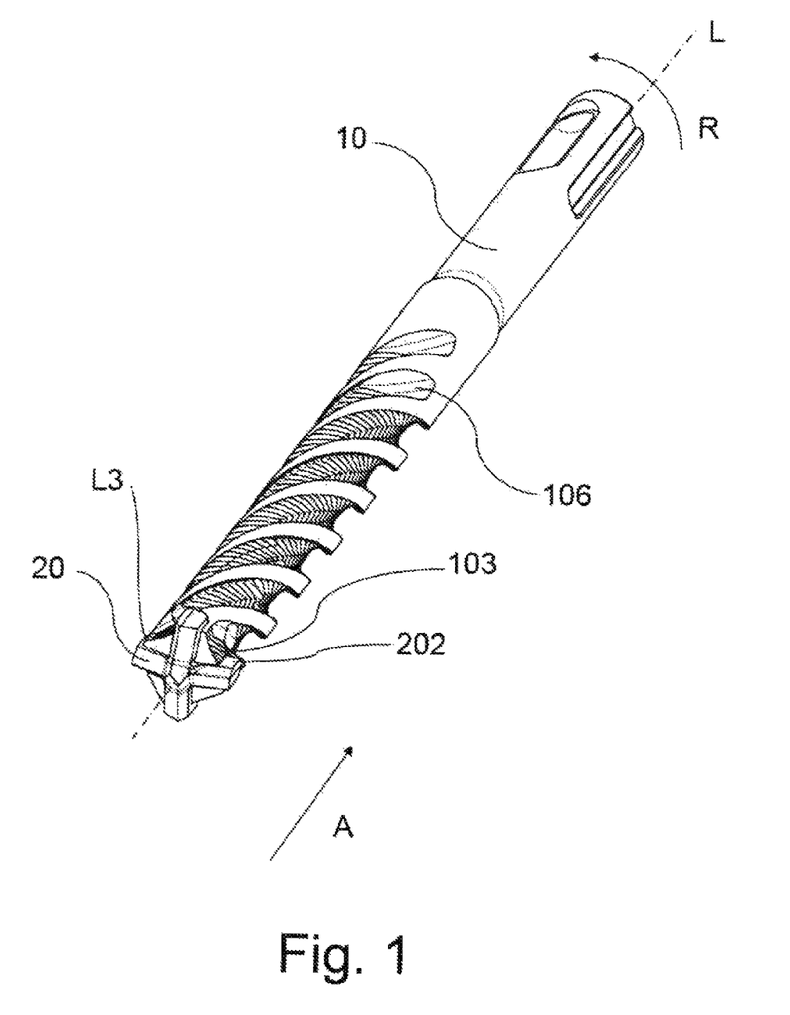
FIG. 1 is a perspective view schematically showing a drill bit according to a first embodiment of the present application.
Figure 2:
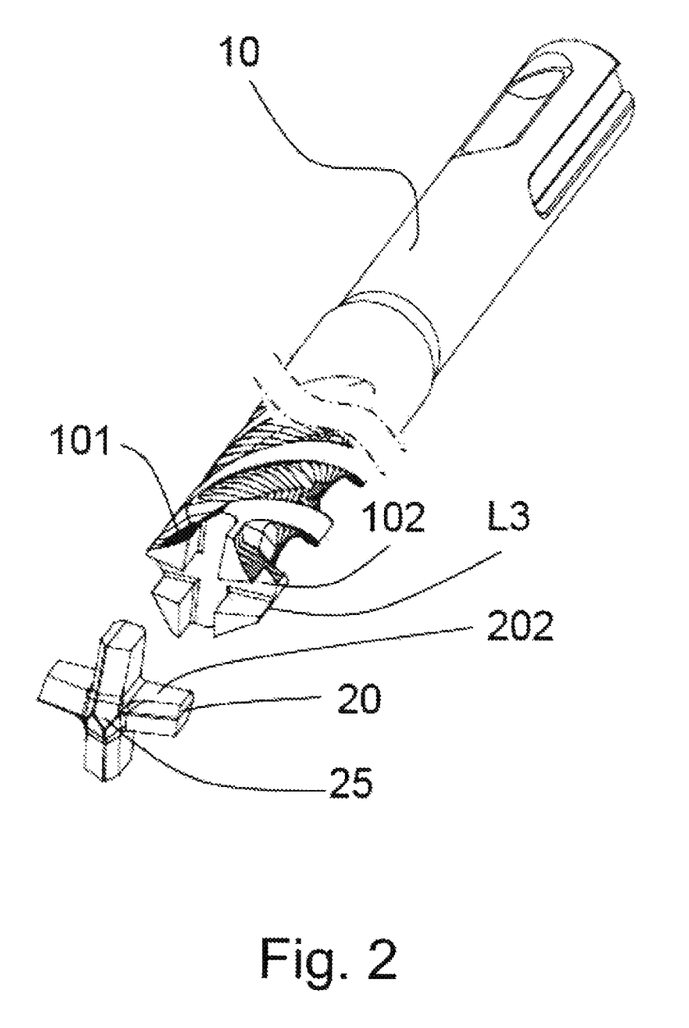
FIG. 2 is a perspective and exploded view schematically showing that a tool body of FIG. 1 is separated from a cutter.
Figure 3:
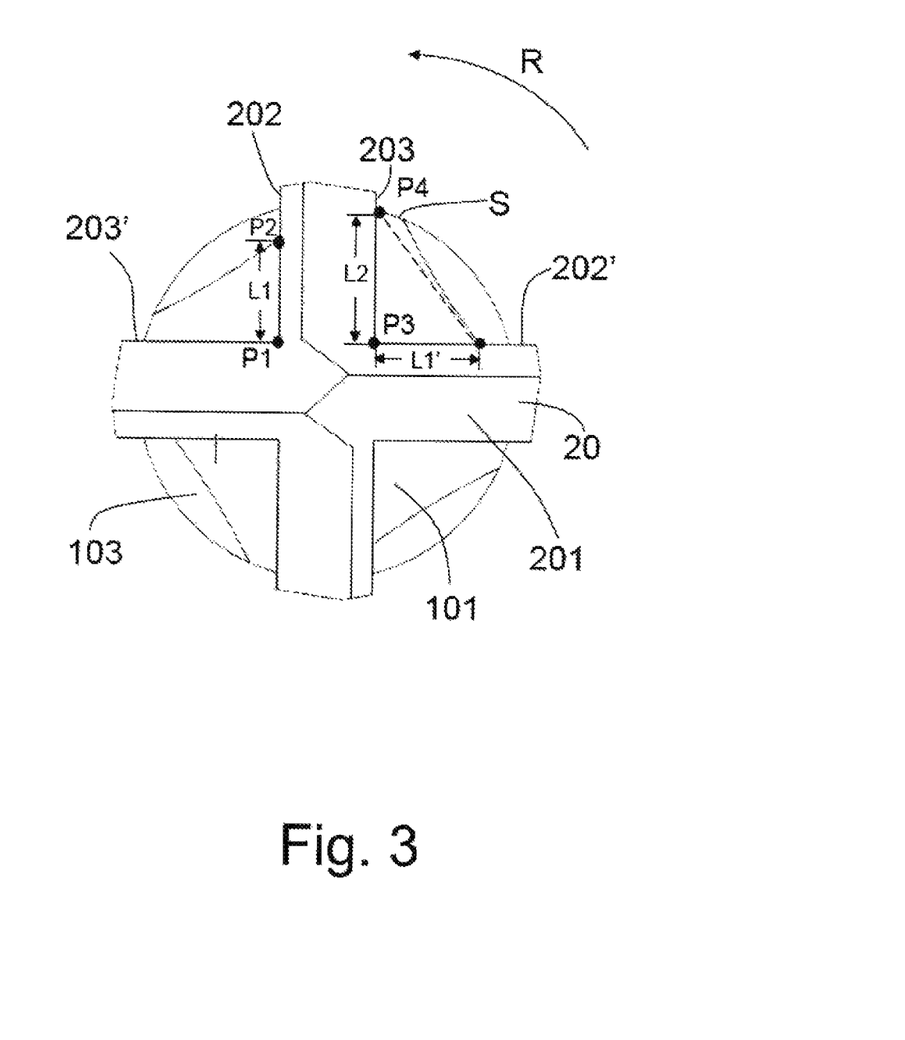
FIG. 3 is a view observed along an arrow A of FIG. 1.

According to a first embodiment shown in FIGS. 1 to 3, the tool body 10 of the drill bit is substantially cylindrical. It is conceived that although not shown, the tool body can be elliptic cylindrical, prismatic or other-shaped. Using a tool steel, a chip removing structure is generally formed on the tool body 10 by rolling, milling or other processing manners. The chip removing structure illustrated in FIG. 1 is a helical groove 106 which extends helically about the central axis L of the tool body. The extending direction of the helical groove 106 depends on a rotating direction R of the drill bit in its operation. That is to say, the extending direction of the helical groove should be designed to facilitate movement of cutting chips towards the proximal direction. A sharp scrape edge can be formed between a sidewall of the chip removing groove and the outer peripheral surface of the tool body 10 such that the tool body can be used to scrape the drilled hole.

In case that the drill bit is used to process a hard object, a hard alloy cutter 20 is generally fitted at a distal end of the tool body 10. Using the hard alloy cutter, the hard object or an object whose composition is complex, such as stone, concrete, brick, hard plastics, softer metals or the like can be drilled and the drilling can be accomplished at a higher speed. Further, by selecting the material by which the cutter is made and designing the cutter carefully, a resistance force encountered in the drilling can be reduced effectively, and the possibility of edge collapse is decreased and good sharpening ability can be maintained (for example, the cutter can be configured to be self-sharpened). The cutter 20 is usually made of a material, such as carbon tungsten alloy, tungsten-cobalt-titanium alloy or the like. Generally, it is formed by the following procedure. A powdered material is sintered in a mould and then is ground by diamonds to have a suitable size, which is inlaid in a clamping slot 102 provided at the distal end 101 of the tool body so as to be integrated with the tool body 10.

A distal part and left and right parts of the cutter 20 protrudes from a distal surface of the tool body 10 by a distance respectively. The cutter 20 is inlaid in the clamping slot 102 and is supported by she material of the tool body 10. The distal end of the cutter 20 forms a cutter head 25 in the form of a central sharp corner to help the drill bit to be centered relative to the object to be processed and help it to drill the latter. The distal end 101 of the tool body can be also formed with a slope corresponding to the shape of the cutter head such that the cutter 20 can be supported favorably. However, the distal end of the tool body 10 can be alternatively flat and no slope is provided there.

As shown mainly in FIG. 3, viewed from the distal end of the drill bit along its axial direction (viewed along an arrow A of FIG. 1, that is an axial view of the distal end of the tool body), the cutter 20 has four blade portions 201 which are arranged circumferentially (along the peripheral direction of the tool body perpendicular to its central axis) on the distal end 101 of the tool body and extends radially relative to the tool body 10. Each of the blade portions 201 has a front side 202 along the rotating direction R of the drill bit and a back side 203 against the rotating direction R of the drill bit. The clamping slot 102 covers the back side 203 of one blade portion 201 by an area larger than that used to cover the front side 202 of the same blade portion 201. By guaranteeing a back side area supporting the blade portion 201 and reducing a front side area formed in front of the blade portion 201, an enlarged chip removing space can be obtained and the drill bit's chip removing ability and its support ability for the cutter are both considered. It can be conceived that the number of the blade portions 201 can be different with respect to different cutters 20. For example, the number of the blade portions may be two or more. In case that the cutter is comprised of several blade portions 201, the blade portions 201 can be integrally formed; or alternatively, they can be designed and formed separately and then fitted onto the tool body.

According to an important aspect of the present application, the drill bit has a notch 103, in communication with the chip removing structure 106, at a location of the tool body behind the rear side 203 of the blade portion. The notch 103 has a proximal end running to the distal end face of the tool body 10. The proximal end is in communication with a distal end of a main body of the chip removing groove 106. That is, the notch 103 extends the chip removing groove 106 to the distal end face of the tool body 10. In other words, the notch 103 forms a start part of the chip removing groove 106, and is not coupled to the main body of the chip removing groove 106. Viewed axially from the distal end of the tool body, the notch 103 is located in a circular zone of projection of the tool body 10, and the front side 202 of the blade portion 201 constitutes a part of the notch 103.

Figure 4:
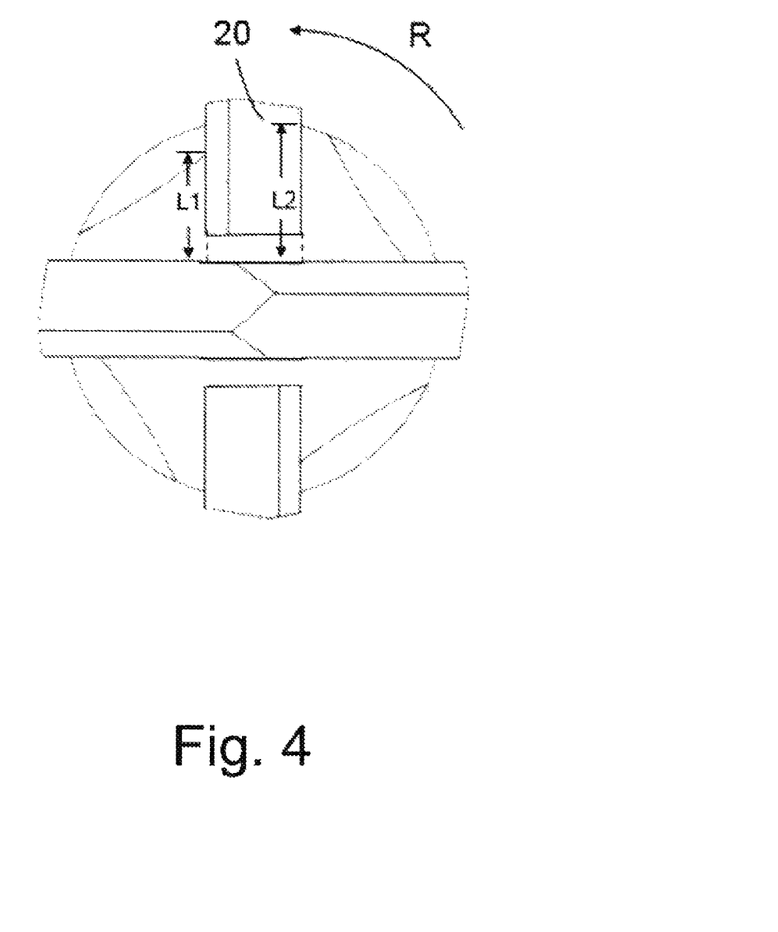
FIG. 4 is a viewing corresponding to FIG. 3 but showing a drill bit according to a second embodiment of the present application.

The front side 202 of one blade portion meets with the back side 203' of one adjacent blade portion, such that an intersection point P1 adjacent to the tool body's axis L in an axial view of the distal end of the tool body (in an example of only two blade portions 202, the intersection point P1 becomes s middle point closest to the tool body's axis L). The front side 202 of the blade portion meets with its clamping slot 102 and thus a front side supporting point P2 appears in the axial view of the tool body's distal end. The back side 203 of the blade portion meets with the front side 202' of one adjacent blade portion such that a back intersection point P3 appears in the axial view of the tool body's distal end. The back side of the blade portion meets with its clamping slot 102 such that a back side supporting point P4 appears in the axial view of the tool body's distal end. A distance from the intersection point P1 to the front side supporting point P2 is defined as a front side reference length L1. A distance from the back intersection point P3 to the back, side supporting point P4 is defined as a back side reference length L2. The back side reference length L2 is 1.2 to 2 times the front side reference length L1. Since the front side reference length L1 and the back side reference length L2 are proportionally designed as above, the chip removing and supporting ability of the drill bit can be well guaranteed. Furthermore, the back side supporting point P4 can be designed to be located on the outer diameter of the tool body. Moreover, from the back side supporting point P4, the outer contour of the tool body has a supporting segment S which coincides with/keeps consistent with the outer diameter of the tool body, so as to provide a relatively stable support. Of course, in the present embodiment, since the main body of the tool body is in the loan of a cylinder, the supporting segment S is a pan of the cylinder's outer contour. In some alternative embodiments where the tool body is non-cylinder-shaped, for example cube-shaped or diamond-shaped, the supporting segment can be art outer face of the cube-shaped or diamond-shaped tool body. Furthermore, said intersection point P1 and said back intersection point P3 each are a real intersection point. However, in some split-type designs and designs where the blade portions do not meet with each other or their intersection parts are transition-processed by rounding off, the intersection point will be an imaginary point thought out by the real structure. Further, in the embodiment, the front side reference length L1 and the back side reference length L2 each are a real supporting length. In some alternative embodiments, for example in a second embodiment of FIG. 4 where the blade portion 20 has split-designed, the front side reference length L1 and the back side reference length L2 each may not be a real supporting length, and they are used for reference purposes only.

As shown in FIGS. 1 to 3, the distal end 101 of the tool body is configured in a manner of rotational symmetry, and the blade portions 201 assembled at the distal end 101 of the tool body are also configured in a manner of rotational symmetry. Therefore, the back intersection point P3 of one blade portion 201 is also the intersection point P1 of another blade portion adjacent to the back side 203 of the first-cited cuter portion. Said another blade portion adjacent to the back side 203 of the blade portion has a front side reference length L1' the same as that of the blade portion 201. As seen in the axial view of the tool body's distal end, in this embodiment, the drill bit has tour blade portions 201 which are arranged circumferentially on the tool body 10 such that they are equally spaced from each other. The back side 203 of one blade portion 201 is perpendicular to the front side 202' of one adjacent blade portion. The area of end-projection of the tool body between two adjacent blade portions located at the distal end of the tool body is larger than the area of projection of a triangle, two right-angle sides of which triangle are along the front side reference length L1' and the back side reference length L2 respectively. By designing the tool body in this way, the area of the notch 103 can be enlarged effectively such that a better chip removing effect can be achieved and the blade portions 201 can be supported sufficiently. As seen in the axial view of the tool body's distal end, the tool body end face between the two adjacent blade portions 201 has an outer contour of projection in the axial view of the tool body's distal end, which outer contour of projection is substantially linear. Since the supporting segment S occupies a small part of the outer contour of projection, it is feasible to ignore its influence on the entire outer contour of projection. Of course, the equally-spaced and split-type design cannot be deemed as any limitation to the present application. For instance, the projection of the distal end of the tool body in the axial view of the distal end of the tool body is substantially regular or irregular polygon-shaped, for example triangular, square or diamond-shaped. The drill bit is provided with blade portions adjacent to corners of the polygon, the number of which blade portions corresponds to the number of the corners. The blade portions are offset towards the same side of the adjacent corners of the triangle in the rotating direction of the drill bit, and particularly can be offset forwards.

According to an important aspect of the present application, the back side supporting point P4 extends by a supporting line L3 at fee distal end 101 of the tool body, which supporting line is parallel to the tool body's axis L to effectively and continually support the blade portion 201. Similarly, the intersection point P1, the back intersection point P3 and the front side supporting point P2 respectively extend by supporting lines (not shown) at the distal end 101 of the tool body, which lines are parallel to the tool body's axis.

Figure 5:
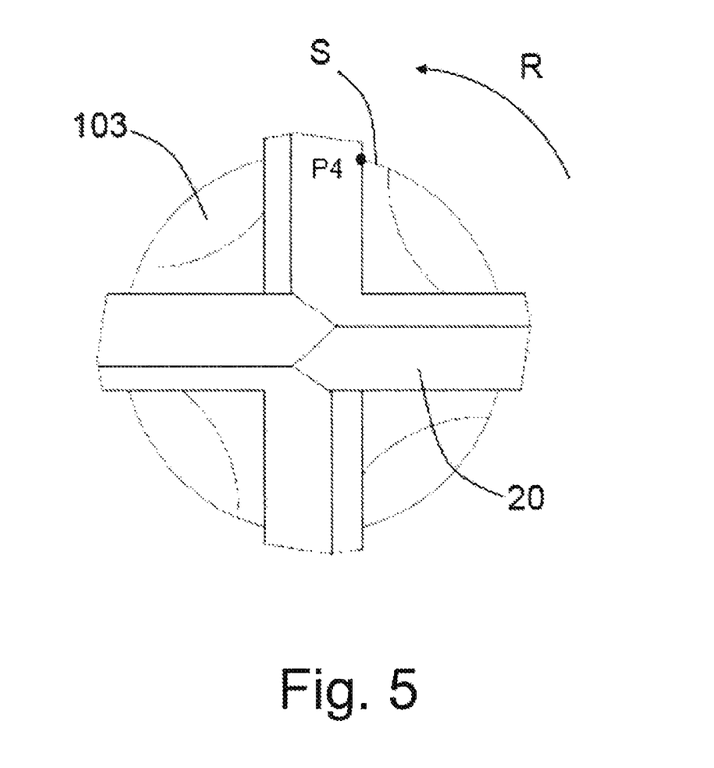
FIG. 5 is a viewing corresponding to FIG. 3 but showing a drill bit according to a third embodiment of the present application.

It should be noted that in the already-mentioned embodiments, such a design is described, in which as seen in the axial view of the tool body's distal end, the area of the tool body between two adjacent blade portions located at the distal end of the tool body is larger than the area of the triangle with the two right-angle sides thereof being along the front side reference length and the back side reference length respectively. However, according to a concrete product's application conditions, a person skilled in the art, alter making trade-off analysis between enlarging the chip removing ability of the notch and weakening the support of the distal end of the tool body for the couter, can provide such a design in which the area of tool body between two adjacent blade portions located at the distal end of the tool body is not larger than (smaller than or equal to) the area of the triangle with the two right-angle sides thereof being along the front side reference length and the back side reference length respectively. This provided design also can be used to achieve the object of the present application. Again, in the first embodiment, the outer contour projection of the tool body end face between the two adjacent blade portions 201 in the axial view of the tool body's distal end is substantially linear. However, in the third embodiment illustrated by FIG. 5, following the back side supporting point P4, the outer contour protection of the toot body also has a supporting segment S which coincides with a path prescribed by the outer diameter of the tool body. Further, the outer contour projection is substantially arc-transitional in an inwardly-recessed manner to enhance the chip removing ability. Of course, the outer contour projection can be arc-transitional in an outwardly-recessed manner or other feasible manners. Obviously, other designs in which the cutter is configured as an X shape, a non-cross shape or a triangular shape can be applicable tor the present application. Further, because the distal end of the tool body is configured such that it is rotationally symmetrical or quasi-rotationally symmetrical, the different between the reference lengths is directly relevant to the different between the front and back side areas. Of course, the front and back side, areas can be adjusted by other suitable manners.

Although the present application has been explained with respect to some concrete embodiments here, the present application is not limited to those detailed contents. Without departing from the basic principle of the present application, various modifications of those contents can be made.

The invention claimed is:

1. A drill bit comprising:
   a tool body, including:
      a main body formed as a cylinder;
      a chip removing structure formed on the main body;
      a notch in communication with the chip removing structure; and
      a distal end provided with a clamping slot; and
   a cutter inlaid in the clamping slot;
   wherein the cutter has at least two blade portions arranged circumferentially on the distal end of the tool body so as to extend radially relative to the tool body,
   wherein each of the at least two blade portions has a front side, which is arranged along a rotating direction of the drill bit, and a back side, which is arranged against the rotating direction,
   wherein the clamping slot covers a back area of the back side of a first blade portion of the at least two blade portions and covers a front area of the front side of the first blade portion, the back area is larger than the front area,
   wherein the notch is in a part of the tool body behind the back side of the first blade portion,
   wherein the front side of a first adjacent blade portion constitutes a part of the notch, and
   wherein, when observed in an axial view of the distal end of the tool body, the notch is located in a region of projection of the cylindrical tool body.

2. The drill bit as cited in claim 1, wherein:
   the front side of the first blade portion meets with the back side of a second adjacent blade portion at an intersection point, which is adjacent to an axis of the tool body, and the intersection point appears in the axial view of the distal end of the tool body,
   the front side of the first blade portion meets with the clamping slot at a front side supporting point, and the front side supporting point appears in the axial view of the distal end of the tool body,
   the back side of the first blade portion meets with the front side of the first adjacent blade portion at a back intersection point, which is adjacent to the axis of the tool body, and the back intersection point appears in the axial view of the distal end of the tool body,
   the back side of the first blade portion meets with the clamping slot at a back side supporting point, and the back side supporting point appears in the axial view of the distal end of the tool body,
   a distance from the intersection point to the front side supporting point defines a front side reference length,
   a distance from the back intersection point to the back side supporting point defines a back side reference length, and
   the front side reference length is 1.2 to 2 times the back side reference length.

3. The drill bit as cited in claim 2, wherein:
   the distal end of the tool body has rotational symmetry,
   the at least two blade portions assembled at the distal end of the tool body have rotational symmetry,
   the back intersection point of the first blade portion is also the intersection point of the first adjacent blade portion, and
   the first adjacent blade portion has a front side reference length which is the same as the front side reference length of the first blade portion.

4. The drill bit as cited in claim 3, wherein:
   the drill bit has four blade portions which are equally-spaced from each other circumferentially on the tool body such that the back side of the first blade portion is perpendicular to the front side of the second adjacent blade portion; and
   when observed in the axial view of the distal end of the tool body, an area of projection of an end face of the tool body between two adjacent blade portions at the distal end of the tool body is not larger than an area of a triangle, two right-angle sides of the triangle arranged along the front side reference length and the back side reference length, respectively.

5. The drill bit as cited in claim 2, wherein:
   the back side supporting point is located at an outer diameter of the tool body, and
   following the back side supporting point, an outer contour of the tool body has a supporting segment which coincides with the outer diameter of the tool body.

6. The drill bit as cited in claim 5, wherein:
   at the distal end of the tool body, the back side supporting point extends by a supporting line which is substantially parallel to the axis of the tool body.

7. The drill bit as cited in claim 1, wherein:
   the front side of the first blade portion meets with the back side of a second adjacent blade portion at an intersection point, and the intersection point appears in an axial view of the distal end of the tool body,
   the front side of the first blade portion meets with the clamping slot at a front side supporting point, and the front side supporting point appears in the axial view of the distal end of the tool body,
   the back side of the first blade portion meets with the front side of the first adjacent blade portion at a back intersection point, the back intersection point is adjacent to an axis of the tool body, and the back intersection point appears in the axial view of the distal end of the tool body, the back side of the first blade portion meets with the clamping slot at a back side supporting point, and the back side supporting point appears in the axial view of the distal end of the tool body, a distance from the intersection point to the front side supporting point defines a front side reference length, a distance from the back intersection point to the back side supporting point defines a back side reference length, the drill bit has four blade portions, the four blade portions are equally-spaced from each other circumferentially on the tool body such that the back side of the first blade portion is perpendicular to the front side of the second adjacent blade portion; and when observed in the axial view of the distal end of the tool body, an area of projection of an end face of the tool body between two adjacent blade portions at the distal end of the tool body is larger than an area of a triangle, the triangle having two right-angle sides arranged along the front side reference length and the back side reference length, respectively.

8. The drill bit as cited in claim 7, wherein a projection of an outer contour of the tool body's end face between the two adjacent blade portions in the axial view of the distal end of the tool body is substantially line-transitional, or arc-transitional in an outwardly-recessed or inwardly-recessed manner.

9. The drill bit as cited in claim 7, wherein:

a projection of the distal end of the tool body in the axial view of the distal end of the tool body is substantially shaped as a polygon, the blades portions of the drill bit are arranged adjacent to respective corners of the polygon and a number of the blade portions is the same as a number of corners of the polygon, and the blade portions are offset towards a same side of adjacent corners of the polygon in the rotating direction of the drill bit.

* * * * *